United States Patent [19]

Schulze

[11] Patent Number: 4,684,540

[45] Date of Patent: Aug. 4, 1987

[54] COATED PIGMENTED PHOSPHORS AND PROCESS FOR PRODUCING SAME

[75] Inventor: Harry O. Schulze, Wyalusing, Pa.

[73] Assignee: GTE Products Corporation, Stamford, Conn.

[21] Appl. No.: 824,760

[22] Filed: Jan. 31, 1986

[51] Int. Cl.$^4$ .............................................. B05D 5/06
[52] U.S. Cl. .................................... 427/71; 427/218; 427/219; 427/380
[58] Field of Search ................... 427/64, 71, 215, 218, 427/219, 380

[56] References Cited

U.S. PATENT DOCUMENTS

| | | | |
|---|---|---|---|
| 2,817,599 | 12/1957 | Edwards et al. | 427/64 |
| 3,544,354 | 12/1970 | Kachel | 427/64 |
| 4,263,339 | 4/1981 | Fischer | 427/64 |
| 4,423,128 | 12/1983 | Koike et al. | 427/64 |
| 4,473,634 | 9/1984 | Dodds et al. | 427/64 |

Primary Examiner—Norman Morgenstern
Assistant Examiner—Janyce A. Bell
Attorney, Agent, or Firm—Donald R. Castle; L. Rita Quatrini

[57] ABSTRACT

A pigmented silicate coated phosphor is disclosed and a process for producing the phosphor. The process involves preparing a relatively uniform aqueous mixture of particles of a phosphor, particles of a deagglomerated pigment, and a free flowing agent and then adding a precipitating agent to the mixture in an amount sufficient to cause the free flowing agent and pigment to co-precipitate upon and coat the phosphor, followed by separating the pigmented phosphor from the resulting liquor. A relatively uniform mixture is formed of the resulting dried phosphor, a water soluble silicate, and water the water being in an amount of sufficient to allow the silicate to coat the surface of the phosphor particles. The mixture is heated at a sufficient temperature for a sufficient time with sufficient agitation to produce the final non-agglomerated silicate coated pigmented phosphor.

9 Claims, No Drawings

COATED PIGMENTED PHOSPHORS AND PROCESS FOR PRODUCING SAME

BACKGROUND OF THE INVENTION

This invention relates to coated pigmented phosphors. More particularly, it relates to silicate coated inorganic pigmented phosphors and to the process for producing the phosphors.

Pigmented phosphors are well known in the art of color cathode ray tube manufacture. In U.S. Pat. Nos. 4,020,231 issued Apr. 26, 1977 and 4,128,674 issued Dec. 5, 1978, both patents assigned to the same assignee as the present invention, use is made of coprecipitation of silica and pigment. In U.S. Pat. No. 4,473,634, also assigned to the same assignee as the present invention, use is made of an aqueous insoluble silicatebased glass matrix.

In U.S. Pat. Nos. 4,020,231 and 4,128,674 in which a positive sol colloidal silica is used, the degree of bonding between silica, pigment, and phosphor is weak and pigment can be lost during the slurry screening or dusting operation in making a television screen.

In U.S. Pat. No. 4,473,634, phosphor, pigment, and a silicate binder such as potassium silicate or sodium silicate solution are mixed in a steam kettle and evaporated to dryness. The dried powder is then baked for two hours at about 450° C. The resulting pigmented phosphor is water washed, filtered, and dried. This results in a phosphor with the pigment particles strongly bonded to the phosphor particles. However, in this process it is difficult to achieve uniformly dispersed pigment covering the surface of the phosphor particles. Lumps or clumps of pigment can occur and this is objectionable in the phosphor screening operation.

SUMMARY OF THE INVENTION

In accordance with one aspect of this invention there is provided a pigmented silicate coated phosphor.

In accordance with another aspect of this invention, there is provided a process for producing the phosphor. The process involves preparing a relatively uniform aqueous mixture of particles of a phosphor, particles of a deagglomerated pigment, and a free flowing agent and then adding a precipitating agent to the mixture in an amount sufficient to cause the free flowing agent and pigment to co-preicipitate upon and coat the phosphor, followed by separating the pigmented phosphor from the resulting liquor. A relatively uniform mixture is formed of the resulting dried phosphor, a water soluble silicate, and water the water being in an amount sufficient only to allow the silicate to coat the surface of the phosphor particles and form a moist powder. The mixture is heated at a sufficient temperature for a sufficient time with sufficient agitation to produce the final non-agglomerated silicate coated pigmented phosphor.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The phosphors of this invention are preferably cathode ray phosphors such as red, blue and green emitting cathode ray phosphors. Especially preferred are red europium activated yttrium oxysulfide such as Sylvania Type 1150 of GTE Products Corporation, europium activated yttrium oxide such as Sylvania Type 1134, and blue silver activated zinc sulfide such as Sylvania Type 1330.

A relatively uniform aqueous mixture of particles of the phosphor, particles of a deagglomerated inorganic pigment and a free flowing agent is first prepared.

The inorganic pigment can be, for example, red $Fe_2O_3$ such as Pfizer Type R-1299 with the europium activated yttrium oxysulfide as the phosphor.

In accordance with a preferred embodiment, a slurry is first formed of the inorganic pigment and water. Preferably a surface active agent such as Antarox BL-240 by GAF or Triton X-100 by Rohm and Haas is added to the pigment slurry. Usually about 1 or 2 drops of the agent is added to about 1000 weight parts of the pigment water slurry.

The pigment is then deagglomerated by standard techniques such as by bead milling the pigment-water slurry or sonic dismembration.

In accordance with the preferred embodiment, a slurry is formed of the phosphor in water. Preferably the temperature is held at from about 30° C. to about 70° C.

The pigment and phosphor slurries are combined to produce a combined slurry the solid phase of which consists essentially of a pigmented phosphor. The combining is done preferably with agitation for at least about ½ hour. Typically, in a red phosphor the pigment makes up from about 0.1% to about 0.3% by weight in the phosphor. Typically in a blue phosphor, the pigment makes up from about 1% to about 3% by weight in the phosphor.

At this point, if colloidal silica is to be the free flowing agent, it may be necessary to adjust the pH of the combined slurry to from about 4.5 to about 5.5 with an acid, which is preferably sulfuric acid. This is the pH range in which the positive charged colloidal silica is stable.

A free flowing agent which is preferably a positively charged colloidal silicon dioxide source is then added to the combined slurry. The preferred colloidal silicon dioxide source is Dupont 130 M or Wesol P from Wesolite Corporation, Wilmington, Delaware. The preferred amount of silicon dioxide is about 0.1% by weight of the phosphor. It is preferred that the resulting mixture be agitated to insure complete mixing of all the components to form the uniform aqueous mixture.

A precipitating agent is added to this uniform aqueous mixture in an amount sufficient to cause the free flowing agent and pigment to co-precipitate upon and coat the phosphor.

In accordance with the preferred embodiment the precipitating agent is a base which is preferably ammonium hydroxide. The base is added to a pH of from about 6 to about 9. Preferably the resulting pH adjusted slurry is then agitated for usually about 1 hour to allow formation of silica pigment gel particles. Due to the nature of the charge on the positive silicon dioxide, it is absorbed on the pigment. As the pH is raised above about 6, gelation occurs and the silica-pigment gel particles stick to the surface of the phosphor particles.

The resulting solid phase of silica pigment gel particles on phosphor particles is then separated from the resulting liquor. The usual method of separation is by first allowing the solid phase to settle, followed by decanting the clear liquor. The solid phase of pigmented phosphor is then filtered off the remaining liquor.

The solid phase pigmented phosphor is then dried preferably at a temperature of from about 100° C. to about 160° C.

A relatively uniform mixture is then formed consisting essentially of the resulting pigmented phosphor, a water soluble silicate, and water. The amount of water is sufficient only to allow the silicate to coat the surface of the phosphor particles, so that in actuality, what is produced is a moist powder rather than a slurry. The preferred silicate is potassium silicate which is typically added in the form of a solution of about 30% by weight of solids. A preferred source of the potssium silicate is Sylvania PS-6. This step is preferably done by charging the pigmented phosphor to a liquids-solids blender dryer. A mixture of water and the silicate, usualy containing an amount of silicon dioxide which will result in a silicon dioxide content of from about 0.25% to about 1.0% by weight in the final phosphor are added slowly to the phosphor with the total weight of liquid being from about 5% to about 10% of the weight of dry solids. The resulting mixture is agitated until an intimate blend of the phosphor and liquid has been attained.

The mixture is then heated at a sufficient temperature for a sufficient time with sufficient agitation to produce the final non-agglomerated silicate coated pigmented phosphor.

In actual practice it is preferred to dry the mixture with agitation to prevent agglomeration of the phosphor while the mixture is in the blender dryer. The drying is done preferably by first heating at a temperature of about 100° C. for a sufficient time with agitation to remove the water. The agitation is necessary because it prevents the phosphor from reagglomerating. Preferably the mixture is dried in a mixer which has two blades which rotate counter to each other, such as in a planetary mixer. The resulting dried phosphor is then heated at from about 400° C. to about 550° C. to dehydrate the silicate to form a water insoluble glassy film silicate coating on the pigmented phosphor.

The heating times depend on the temperature and on the type of furnace, and type of containers, etc.

The resulting silicate coated pigmented phosphor can be milled by standard techniques such as by bead milling to remove any agglomerates which may be present.

The silicate coated phosphor can also be water washed to remove any soluble impurities.

The final silicate coated pigmented phosphor of this invention is now ready for use in the particular applications.

To more fully illustrate this invention, the following nonlimiting examples are presented.

EXAMPLE 1

About 2.5 kg of Sylvania Type $Y_2O_2S$:Eu red phosphor is charged to a 12 liter container. The phosphor is mixed with about 5 to 6 liters of deionized water and the temperature is adjusted to from about 30 to about 40° C. About 5 g of $Fe_2O_3$ red pigment such as Pfizer R-1299 or Ferro VX-3100 is milled by bead milling or sonic dismembrator in about 200 ml of cold deionized water containing 1 or 2 drops of a surface active agent such as GAF Antarox BL-240 or Rohm and Haas Triton X-100. The pigment slurry is then added to the phosphor slurry and the resulting slurry is agitated for about ½ hour. The resulting slurry is then adjusted to a pH of from about 4.5 to about 5.5 with sulfuric acid. About 25 ml of a positive sol colloidal silica such as DuPont 130 M or Wesol P from Wesolite Corporation is then added. The resulting mixture is agitated for about 15 minutes and the pH is adjusted to a value of from about 8.0 to about 9.0 with about a 1 normal solution of ammonium hydroxide. Agitation is continued for a period of about 1 hour. The mixture is allowed to stand so that the solid pigmented phosphor can settle out. The mixture is decanted and the phosphor is then filtered off and dried at about 150° C. to about 160° C. The resulting dried pigmented phosphor powder is then charged to a liquids-solids blender dryer, and a mixture of about 200 ml deionized water and about 100 ml of potassium silicate containing about 30% by weight solids are slowly added to the stirred powder. The mixture is agitated until an intimate blend of pigmented phosphor powder and liquid is attained. The mixture is then dried while being stirred to prevent agglomeration of the phosphor. The dried phosphor is then transferred to silica trays and baked for about 2 hours at about 450° C. The resulting baked phosphor is then lightly bead milled to remove essentially all agglomerates and washed with water. The washed phosphor is then slurried with about 5 liters of hot deionized water. About 7 ml of DuPont HS-30 Ludox is added and the resulting mixture is agitated for about 15 minutes. About 3.5 g of $MgSO_4 \cdot 7H_2O$ is dissolved in about 100 ml of deionized water and added to the mixture. Agitation is continued for about ½ hour. The resulting phosphor is allowed to settle and the liquid is decanted. The phosphor is washed to a conductivity of about 20 μmho or less, filtered, dried at about 150° to about 160° C. and then sieved through a 400 mesh screen. It is now ready for use.

EXAMPLE 2

The process given in Example 1 is repeated that the phosphor is Sylvania Type 1134 $Y_2O_3$:Eu red.

EXAMPLE 3

The process of Example 1 is repeated except that the phosphor is Sylvania Type 1330 blue ZnS:Ag.

About 4.7 kg of the blue phosphor is slurried with about 10 liters of hot deionized water. About 72 g of $CoAl_2O_4$ blue pigment Type H7546 from Harshaw Chemical Co. is milled in about 2 liters of deionized water containing about 0.25 ml of BL-240 from GAF Corporation as a surfactant. The phosphor and milled pigment are mixed together by stirring and the pH of the resulting combined slurry is adjusted to from about 4.5 to about 5.5 with about 10% by volume sulfuric acid. About 46 ml of Wesol P positive sol $SiO_2$ are added and agitated for about 10 minutes. The pH of the combined slurry is adjusted to from about 8.5 to about 9.0 with ammonium hydroxide having a concentration of about 1 normal. The resulting pH adjusted slurry is agitated for about ½ hour. The resulting pigmented phosphor is allowed to settle and the liquid is decanted off. The pigmented phosphor is then filtered off, washed with hot deionized water on the filter and then dried at from about 120° C. to about 160° C. in an oven. The resulting dried pigmented phosphor is then transferred to a liquids-solids blender or drying kettle as in Example 1 and about 750 ml of solution containing about 183 ml of Sylvania PS-6 potassium silicate is slowly added with mixing so that complete wetting of the surface of the powder is achieved. The powder is then heated at from about 70° C. to about 100° C. and stirred until dry. The dried powder is then transferred to silica trays and baked for about 2 hours at about 450° C. The resulting baked silicate coated pigmented phosphor is then lightly milled to deagglomerate the phosphor. It is then washed with water. The phosphor is then overcoated with a 0.10% by weight $SiO_2$ using DuPont HS-30 Ludox or equivalent by a standard coating technique as described in Example 1. After the coating, the phosphor is washed to a conductivity of about 20 μmho, filtered, and dried. The resulting phosphor is then sieved through a 400 mesh screen and is ready for use in the application.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a pigmented coated phosphor, said process comprising:
   (a) deagglomerating a pigment;
   (b) preparing a relatively uniform aqueous mixture of particles of a phosphor, particles of the pigment, and a free flowing agent;
   (c) adding a precipitating agent to said mixture in an amount sufficient to cause said free flowing agent and said pigment to coprecipitate upon and coat said phosphor;
   (d) separating the resulting pigmented phosphor particles from the resulting liquor;
   (e) drying said pigmented phosphor particles;
   (f) forming a relatively uniform mixture consisting essentially of the resulting dried pigmented phosphor particles, a source of a water soluble silicate, and water, with the amount of water being sufficient only to allow the silicate to coat the surface of said phosphor particles and form a moist powder;
   (g) heating the resulting mixture of pigmented phosphor particles and silicate at a sufficient temperature for a sufficient time with sufficient agitation to produce the final nonagglomerated silicate coated pigmented phosphor.

2. A process of claim 1 wherein said free flowing agent is positively charged colloidal silica.

3. A process of claim 2 wherein said precipitating agent is a base.

4. A process of claim 3 wherein said base is ammonium hydroxide.

5. A process of claim 4 wherein the sufficient amount of base raises the pH to from about 6 to about 9.

6. A process of claim 1 wherein said aqueous mixture is prepared by the steps of: deagglomerating said pigment, forming aqueous slurries of said pigment in water and said phosphor in water and combining said slurries; and adding to the combined slurries said free flowing agent.

7. A process of claim 1 wherein said silicate is potassium silicate.

8. A process of claim 1 wherein said mixture of pigmented phosphor and silicate is heated at a temperature of about 100° C. with agitation to remove water followed by heating at a temperature of from about 400° C. to about 550° C. to dehydrate said silicate to form a water insoluble glassy film silicate coating on said pigmented phosphor.

9. A product produced by the process of claim 1.

* * * * *